(12) United States Patent  Kradjel et al.

(10) Patent No.: US 8,340,277 B2
(45) Date of Patent: Dec. 25, 2012

(54) BARTERING SYSTEM AND METHOD FOR CONTROLLING POSITION IN A WAIT QUEUE IN A CONTACT CENTER

(75) Inventors: Howard G. Kradjel, Lincroft, NJ (US);
Paul Roller Michaelis, Louisville, CO (US)

(73) Assignee: Avaya Inc., Basking Ridge, NJ (US)

( * ) Notice: Subject to any disclaimer, the term of this patent is extended or adjusted under 35 U.S.C. 154(b) by 785 days.

(21) Appl. No.: 12/474,981

(22) Filed: May 29, 2009

(65) Prior Publication Data

US 2010/0303226 A1    Dec. 2, 2010

(51) Int. Cl.
*H04M 3/00* (2006.01)
*H04M 5/00* (2006.01)

(52) U.S. Cl. ......... 379/266.01; 379/265.01; 379/265.09; 379/265.1; 379/266.06

(58) Field of Classification Search ............. 379/266.01, 379/266.06, 266.03, 265.01, 265.05, 265.09, 379/265.1; 705/1; 370/352
See application file for complete search history.

(56) References Cited

U.S. PATENT DOCUMENTS

| 5,946,388 | A  | * | 8/1999 | Walker et al. | ............ | 379/266.01 |
| 6,882,641 | B1 |   | 4/2005 | Gallick et al. | | |
| 7,016,485 | B2 |   | 3/2006 | Shtivelman | | |
| 7,050,569 | B1 | * | 5/2006 | Weaver et al. | ........... | 379/266.01 |
| 2003/0195753 | A1 | * | 10/2003 | Homuth | ............................. | 705/1 |
| 2007/0165608 | A1 | * | 7/2007 | Altberg et al. | ................. | 370/352 |
| 2008/0040196 | A1 |   | 2/2008 | Coon et al. | | |

* cited by examiner

*Primary Examiner* — Thjuan K Addy
(74) *Attorney, Agent, or Firm* — Sheridan Ross P.C.

(57) ABSTRACT

A contact center establishes a communication with a user. The communication is placed into a position in a wait queue that has other position(s) with other communication(s) that are waiting to be serviced by contact center agents. An offer is made to the user to change an amount of time to wait in the wait queue before being connected to a contact center agent. The offer can be based on a commodity such as money, frequent flyer miles, willingness to listen to an advertisement while holding, completing a survey, and the like. In response to the user accepting the offer, the position of the communication in the wait queue is changed to a different position. This allows the user to interactively adjust their wait time.

28 Claims, 3 Drawing Sheets

BARTERING SYSTEM AND METHOD FOR CONTROLLING POSITION IN A WAIT QUEUE IN A CONTACT CENTER

TECHNICAL FIELD

The system and method relates to contact centers, and in particular to contact center queue management.

BACKGROUND

Currently, there are a variety of systems that are used to manage calls to contact centers. When a call is received in the contact center during heavy load periods, the call may be placed in a wait queue. The call can be placed ahead of other calls based on various criteria such as who is calling, existence and or terms of a service contract, and the like. After being placed in the wait queue, the caller must wait his/her turn in order to talk to an agent. A disadvantage associated with these types of systems is that the caller cannot negotiate his/her position in the wait queue after being placed in the wait queue. For example, a caller who is facing a long waiting time cannot negotiate a better wait time to be serviced or a higher position in the wait queue. Similarly, the contact center cannot negotiate with a caller who is in the middle of the wait queue, offering a commodity to the caller in exchange for the caller's willingness to move backward in the queue.

Systems such as those disclosed in U.S. Pat. No. 7,016,485 disclose an emergency response system where a caller can negotiate with an Interactive Voice Response (IVR) system. If the caller indicates to the IVR system that the call is a high priority call, the call is routed to the original destination. If the call is not a high priority, the call can be placed in a wait queue. This system, like the previous systems, lacks the capability of the caller being able to negotiate his/her position in the wait queue. Once being placed in the wait queue, the caller cannot negotiate his/her position in the wait queue.

SUMMARY

The system and method described herein are directed to solving these and other problems and disadvantages of the prior art. A contact center establishes a communication with a user. The communication is placed into a position in a wait queue that has other position(s) with other communication(s) that are waiting to be serviced by contact center agents. An offer is made to the user to change an amount of time to wait in the wait queue before being connected to a contact center agent. The offer can be based on a commodity such as money, frequent flyer miles, willingness to listen to an advertisement while holding, completion of a survey, a shorter/longer wait period in a future call, and the like. The offer to the user may be in the form of asking the user to provide a commodity in exchange for moving forward in the queue, or offering to provide a commodity to the user in exchange for his/her willingness to move backward in the queue. The offers from the contact center to the user can be made at any time while the caller is in queue, can be made more than once while the caller is in queue, and can vary in response to changing needs and conditions at the contact center. In response to the user accepting the offer, the position of the communication in the wait queue is changed to a different position. This allows the user to interactively adjust their wait time.

In addition, service agents (via service agent contact centers) can make offers to service a communication in a wait queue. The contact center can accept offers or parts of offers. Upon acceptance of an offer or part of an offer, the contact center directs the communication to the service agent. The service agent then services the communication.

BRIEF DESCRIPTION OF THE DRAWINGS

These and other features and advantages of the system and method will become more apparent from considering the following description of an illustrative embodiment of the system and method together with the drawings, in which.

DETAILED DESCRIPTION

Figure 1:
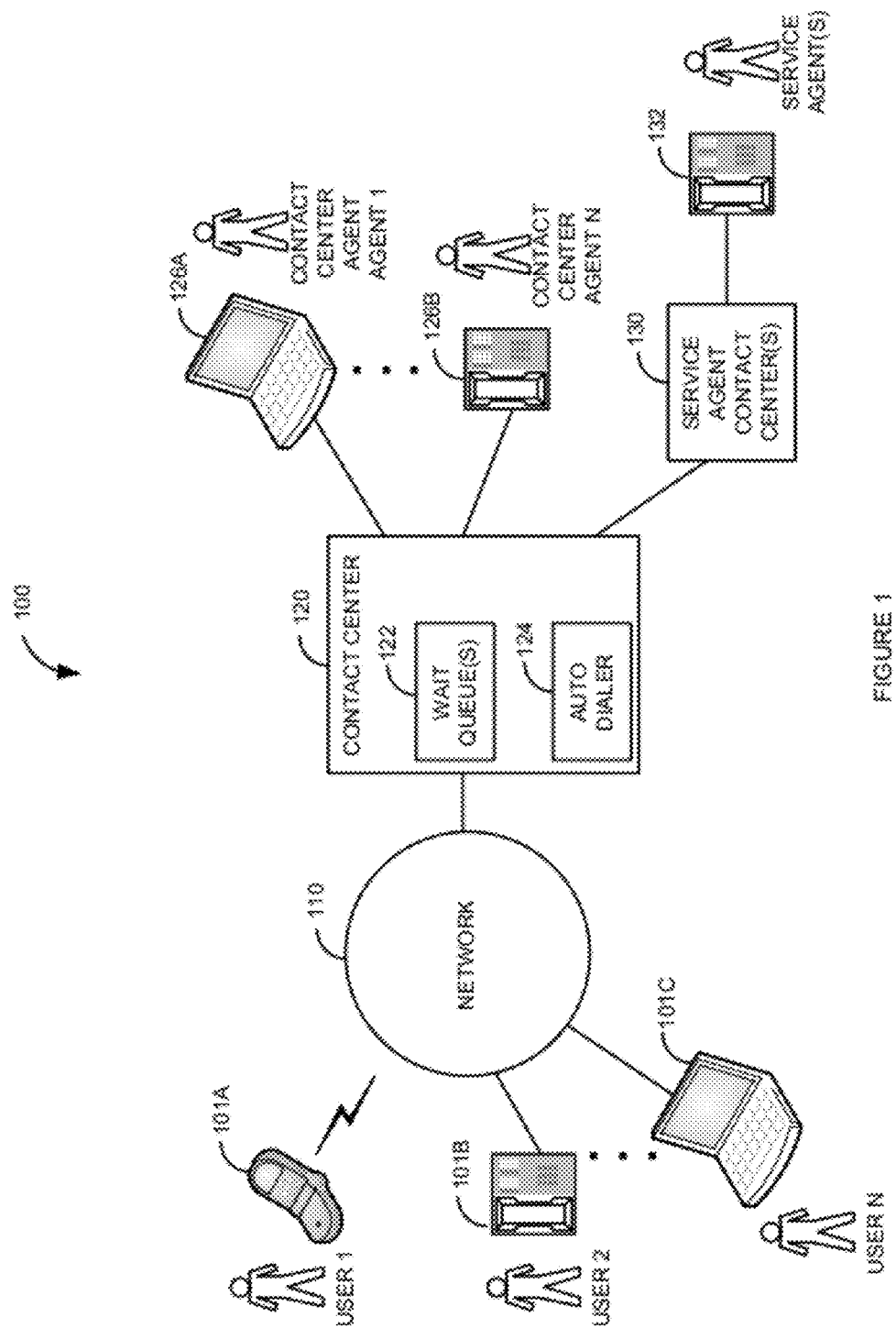
FIG. 1 is a block diagram of a first illustrative system for negotiating a position in a wait queue.

FIG. 1 is a block diagram of a first illustrative system 100 for negotiating a position in a wait queue 122. The first illustrative system 100 for negotiating a position in a wait queue 122 comprises a user communication device(s) 101, a network(s) 110, a contact center(s) 120, a contact center agent communication device(s) 126, a service agent contact center(s) 130, and a service agent communication device(s) 132. The user communication device(s) 101 may be any type of device capable of sending data from a user such as a cellular telephone 101A, a telephone 101B, a Personal Computer (PC) 101C, a Personal Digital Assistant (PDA), and the like. The network 110 may be any type of network such as the Internet, a Local Area Network (LAN), a Wide Area Network (WAN), the Public Switched Telephone Network (PSTN), a cellular network, and the like.

The contact center 120 may be any type of system/software capable of routing communications such as a Private Branch Exchange (PBX), a central office switch, a router, a server, and the like. The contact center 120 comprises wait queue(s) 122 and an auto-dialer 124. The wait queue(s) 122 are queues where communications from users are placed on hold until the communication can be serviced by a contact center agent. A communication may be a voice communication, a video communication, an Instant Message (IM) communication, a chat, an email, and the like. The auto-dialer 124 is a system that can automatically call a user when a contact center agent becomes available. The contact center 120 has one or more contact center agent communication devices 126 that service one or more contact center agents.

The contact center 120 may also connect to a service agent contact center 130. The service agent contact center 130 offers bids for servicing communications waiting in the wait queue(s) 122 in the contact 120. The service agent contact center 130 has one or more service agent communication device(s) 132. Service agents use the service agent communication devices 132.

The contact center 120 is configured to establish a communication with a user. Establishment of the communication can be accomplished in several ways such as the user initiating the communication with the contact center 120, a contact center agent initiating the communication with the user, the auto-dialer 124 initiating the communication between the contact center agent and the user, and the like. The establishment of the communication can be accomplished using a variety of mechanisms such as a keypad, a Graphical User Interface (GUI), a voice response system, an email system, a web page, and the like. The contact center 120 places the communication in the wait queue 122. The communication can be placed in the wait queue 122 in a variety of ways such as upon receipt of the communication in the contact center 120, after the user interacts with an Interactive Voice Response (IVR) system (not shown), after speaking with a contact center agent, and the like.

The wait queue 122 has at least one additional communication with another user. The communications from the users are placed into a position in the wait queue 122. Typically, this is on a first come first serve basis. For example, if a communication from user 1 on user communication device 101A is received first, the communication from user 1 is placed in the first position in the wait queue 122. If a communication from user 2 on user communication device 101B is received second (before the communication from user 1 is serviced by a contact center agent), the communication from user 2 is placed in the second position in the wait queue 122.

While the users of the communications are waiting in the wait queue 122, the contact center 120 makes an offer to one or more of the users. The offer is an offer to the user to change an amount of time to wait in the wait queue 122 before being connected to a contact center agent 126. The offer can be based on a commodity of value. The commodity of value can be anything of value to the parties such as money, frequent flyer miles, a discount (e.g. a discount on a purchase the caller is calling about), a coupon, a willingness to listen to an advertisement while holding, completing a survey, and the like. The commodity could span multiple calls. For example, the user could barter to have a shorter/longer wait period in a future call into the contact center 120.

The offer may vary based on a variety of conditions. For example, the offer can be based on a projected wait time to service the communication. If the wait time is long, the offer could be an offer of additional frequent flyer miles if the user is willing to wait even longer or an offer of a deduction in the caller's current frequent flyer miles total to decrease the wait time. The offer could be to move the call up or down a specific number of positions in the wait queue 122. The value of the offer can also vary based on the size (number of positions) of the wait queue 122. For example, if the numbers of positions in the wait queue 122 are small, the price to move up may be less than if the numbers of positions in the wait queue 122 are large. The value of the offer can vary based on the numbers of positions in the wait queue 122 that are ahead of the communication. The value of the offer can be based on waiting for a specific time in the wait queue 122.

The user can accept the offer in a variety of ways such as interacting with an Interactive Voice Response (IVR) system, using a Graphical User Interface (GUI), interacting with a soft phone running on a Personal Computer (PC) and the like. In response to the user accepting the offer, the contact center 120 changes the position of the communication in the wait queue 122 to a different position. The change in positions can either be forward in the wait queue 122 or backward in the wait queue 122. The offer can be to have the caller call back at a different time or have the auto-dialer 124 contact the user when an agent is available.

Access to the first illustrative system 100 for negotiating a position in a wait queue 122 can be done in a variety of ways. For example, a designated telephone number and/or address (e.g. a Universal Resource Locator (URL) can be used to access the first illustrative system 100. If the user does not want to receive an offer, the user can call a different telephone number or go to a different URL and be processed using traditional techniques.

Figure 2:
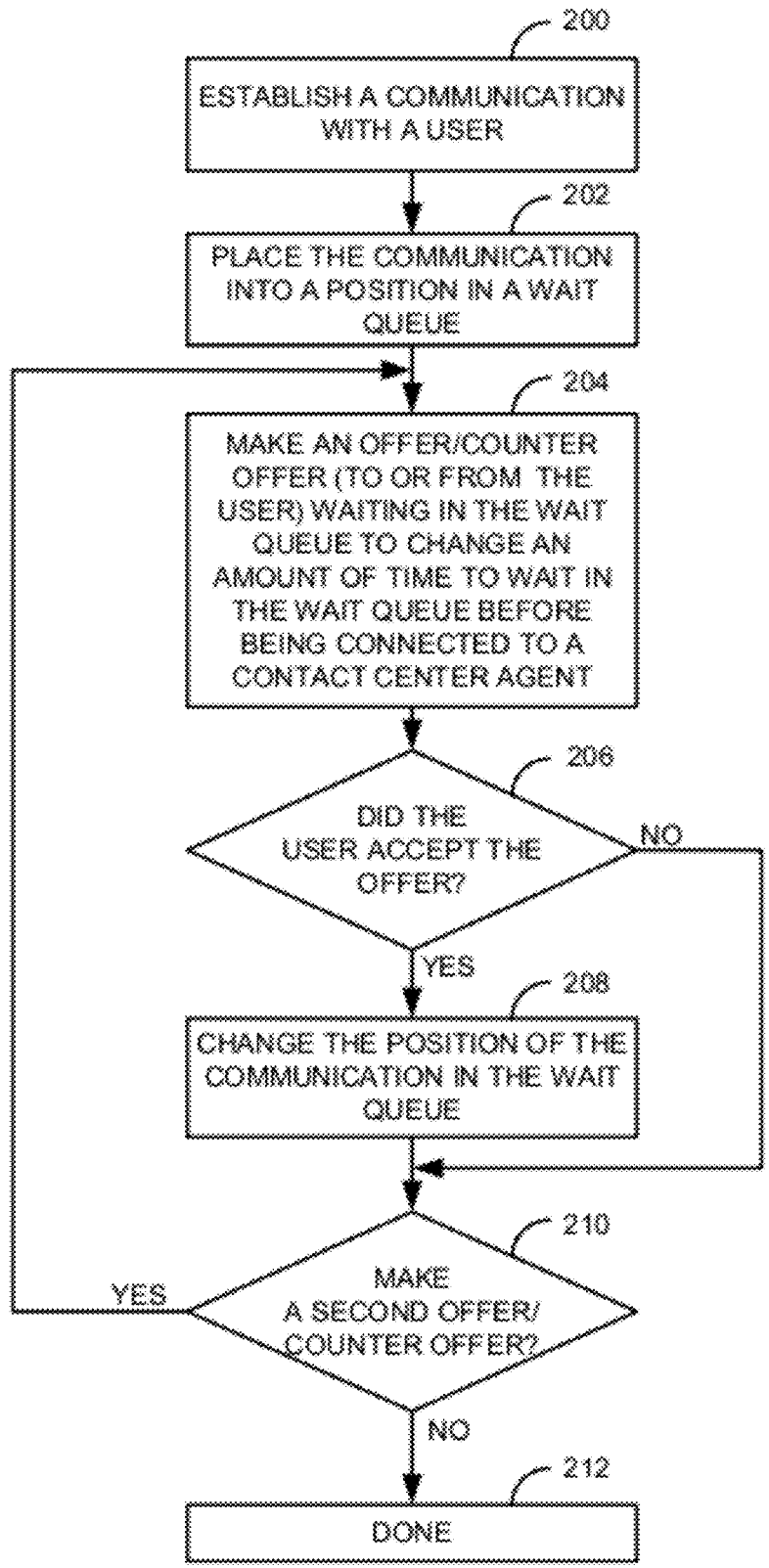
FIG. 2 is a flow diagram of a method for negotiating a position in a wait queue.

FIG. 2 is a flow diagram of a method for negotiating a position in a wait queue 122. Illustratively, the user communication devices 101, the contact center 120, the contact center agent communication devices 126, the service agent contact center 130, and the service agent communication device 132 are stored-program-controlled entities, such as a computer, which performs the method of FIGS. 2-3 by executing a program stored in a storage medium, such as a memory or disk.

The contact center 120 establishes 200 a communication with a user. The contact center 120 places 202 the communication from the user into a position in the wait queue 122. The wait queue 122 has a plurality of positions. The other positions in the wait queue 122 have additional communications from other users. The contact center 120 makes an offer 204 to the user waiting in the wait queue 122 to change an amount of time to wait in the wait queue 122 before being connected to a contact center agent 126.

If the user does not accept the offer in step 206, the process goes to step 210. Otherwise, if the user accepts the offer in step 206, the contact center 120 changes 208 the position of the communication in the wait queue 122 to a different position in the wait queue 122. The contact center 120 determines if the contact center 120 wants to make a second offer/counter offer to the user. If the contact center 120 wants to make a second offer in step 210, the process goes to step 204. Otherwise, the process is done 212.

Figure 3:
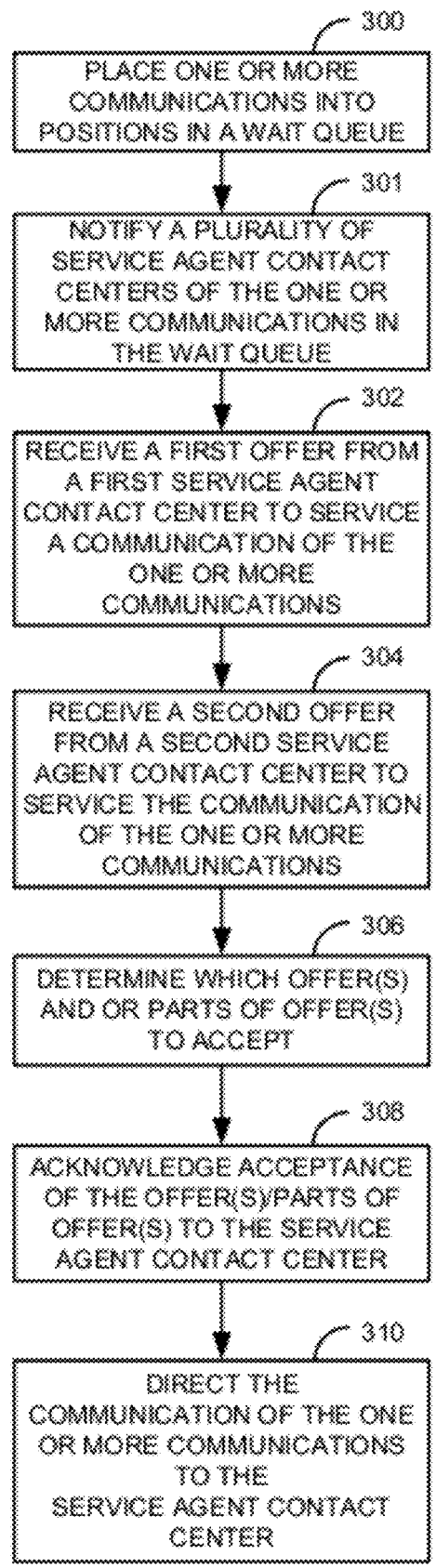
FIG. 3 is a flow diagram of a method to allow service agent contact centers to negotiate to service communications in a wait queue.

FIG. 3 is a flow diagram of a method to allow service agent contact centers 130 to negotiate to service communications in a wait queue 122. The contact center 120 places 300 one or more communications into one or more positions in a wait queue 122. The contact center notifies 301 a plurality of service agent contact centers (a first service agent contact center 130 and a second service agent contact center 130) of the one or more communications in the wait queue. The contact center 120 receives 302 a first offer from a first service agent contact center 130 to service at least one of the one or more communications in the wait queue 122. The first offer is based on a commodity of value. The contact center 120 receives 304 a second offer from a second service agent contact center 130 to service at least one of the one or more communications in the wait queue 122. The second offer is also based on a commodity of value.

The first offer and the second offer do not have to be based on the same commodity of value. The commodity of value can vary and can be a combination of commodities. For example, the commodity of value can be a service time, a type of service, specific agent of the first service agent or a specific group of agents of the first service agent (i.e. routing the communication to a specific agent), and/or money.

The contact center 120 determines 306 which of the offers and/or parts of the offers to accept. The contact center 120 may only elect to select part of the offer. For example, the offer may be to service ten of the communications in the wait queue 122. The contact center 120 may only accept servicing of five of the communications in the wait queue 122. The contact center 120 may accept both offers. For example, if there are ten communications in the wait queue 122 and both offers are to service five communications for the same price, the contact center 120 can elect to accept both offers. The contact center 120 can elect to accept one offer and part of another offer. The contact center 120 could decline one or both offers. The contact center 120 acknowledges 308 acceptance of the offer(s)/parts of offer(s) to the service agent contact center 130. Step 308 can be optional. This is because the service agent contact center 130 can learn of the acknowledgement when the communication of the one or more communications is directed to the service agent contact center 130 in step 310. The contact center 120 directs 310 the communication of the one or more communications (i.e. the communication(s) in the offer) to the service agent contact center 130.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

Of course, various changes and modifications to the illustrative embodiment described above will be apparent to those skilled in the art. These changes and modifications can be made without departing from the spirit and the scope of the system and method and without diminishing its attendant advantages. The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A system comprising:
a contact center configured to establish a communication with a user, place the communication into a position in a wait queue, wherein the wait queue has a plurality of positions comprising at least one additional communication, make or receive a first offer to change an amount of time to wait in the wait queue before being connected to a contact center agent, in response to the user accepting the first offer, changing the position of the communication in the wait queue to a different position in the plurality of positions, and make a second offer to the user waiting in the wait queue to change position in the wait queue based on the amount of a commodity, a different amount of the commodity, or the different amount of a different commodity, wherein the second offer is made after the user accepted the first offer.

2. The system of claim 1, wherein the contact center is further configured to receive a request to establish the communication from the user or to send a request to establish the communication with the user.

3. The system of claim 1, wherein the first offer may vary based on at least one of the following: a projected wait time to service the communication, the number of positions in the wait queue, the communication being serviced in a specific time period, and the number of positions in the wait queue that are ahead of the communication.

4. The system of claim 1, wherein a designated telephone number or Universal Resource Locator (URL) is used to establish the communication.

5. The system of claim 1, wherein the communication is one of the following: a voice communication, a video communication, an Instant Message (IM), a chat, and an email.

6. The system of claim 1, wherein the first offer is based on a commodity of value that can be at least one of the following: money, frequent flyer miles, a discount, a coupon a willingness to listen to an advertisement while on hold, completing a survey, a shorter/longer wait period in a future call.

7. The system of claim 1, wherein the first offer is from the contact center, and wherein the contact center receives a counter offer from the user in response to the first offer from the contact center.

8. The system of claim 1, wherein the first offer is from the user, and wherein the contact center makes a counter offer in response to the first offer from the user.

9. A system comprising:
a contact center configured to place one or more communications into one or more positions in a wait queue, notify a first service agent contact center and a second service agent contact center of the one or more communications in the one or more positions in the wait queue, receive a first offer from the first service agent contact center to service the at least one of the one or more communications based on a commodity of value, receive a second offer from the second service agent contact center to service the at least one of the one or more communications based on the commodity of value, accept the first offer or part of the first offer from the first service agent contact center, and direct the at least one of the one or more communications to the first service agent contact center.

10. The system of claim 9, wherein the commodity of value is at least one of the following: a service time, a type of service, a specific agent of the first service agent contact center, a group of agents of the first service agent contact center, or money.

11. The system of claim 9, wherein the contact center is further configured to decline the second offer, accept the second offer, or accept part of the second offer.

12. The system of claim 9, wherein the contact center is further configured acknowledge acceptance of the first offer or part of the first offer to the first service agent contact center.

13. A method comprising:
establishing a communication with a user;
placing the communication into a position in a wait queue, wherein the wait queue has a plurality of positions comprising at least one additional communication;
making a first offer to or receiving the first offer from the user waiting in the wait queue to change an amount of time to wait in the wait queue before being connected to a contact center agent;
responsive to the user accepting the first offer, changing in the contact center the position of the communication in the wait queue to a different position in the plurality of positions; and
making a second offer to the user waiting in the wait queue to change position in the wait queue based on the amount of the commodity, a different amount of the commodity, or the different amount of a different commodity, wherein the second offer is made after the user accepted the first offer.

14. The method of claim 13, wherein step (a) is accomplished by receiving a request to establish the communication from the user or by the contact center sending a request to establish the communication with the user.

15. The method of claim 13, wherein the first offer may vary based on at least one of the following: a projected wait time to service the communication, the number of positions in the wait queue, the communication being serviced in a specific time period, and the number of positions in the wait queue that are ahead of the communication.

16. The method of claim 13, wherein a designated telephone number or Universal Resource Locator (URL) is used to establish the communication.

17. The method of claim 13, wherein the communication is one of the following: a voice communication, a video communication, an Instant Message (IM), a chat, and an email.

18. The method of claim 13, wherein the first offer is based on a commodity of value that can be at least one of the following: money, frequent flyer miles, a discount, a coupon, a willingness to listen to an advertisement while on hold, completing a survey, or a shorter/longer wait period in a future call.

19. The method of claim 13, wherein the first offer is from the contact center, and further comprising the step of receiving a counter offer from the user in response to the first offer from the contact center.

20. The method of claim 13, wherein the first offer is from the user, and further comprising the step of the contact center making a counter offer in response to the first offer from the user.

21. A method comprising:
  placing one or more communications into one or more positions in a wait queue;
  notifying a first service agent contact center and a second service agent contact center of the one or more communications in the one or more positions in the wait queue;
  receiving a first offer from the first service agent contact center to service the at least one of the one or more communications based on a commodity of value;
  receiving a second offer from the second service agent contact center to service at least one of the one or more communications based on the commodity of value;
  accepting the first offer or part of the first offer from the first service agent contact center; and
  directing the at least one of the one or more communications to the first service agent contact center.

22. The method of claim 21, wherein the commodity of value is at least one of the following: a service time, a type of service, a specific agent of the first service agent contact center, a group of agents of the first service agent contact center, or money.

23. The method of claim 21, further comprising at least one of the following steps: declining the second offer, accepting the second offer, or accepting part of the second offer.

24. The method of claim 21, further comprising the step of acknowledging acceptance of the first offer or part of the first offer to the first service agent contact center.

25. An apparatus comprising:
  means for establishing a communication with a user;
  means for placing the communication into a position in a wait queue, wherein the wait queue has a plurality of positions comprising at least one additional communication;
  means for making a first offer to or receiving the first offer from the user waiting in the wait queue to change an amount of time to wait in the wait queue before being connected to a contact center agent;
  responsive to the user accepting the first offer, means for changing in the contact center the position of the communication in the wait queue to a different position in the plurality of positions; and
  means for making a second offer to the user waiting in the wait queue to change position in the wait queue based on the amount of the commodity, a different amount of the commodity, or the different amount of a different commodity, wherein the second offer is made after the user accepted the first offer.

26. An apparatus comprising:
  means for placing one or more communications into one or more positions in a wait queue;
  means for notifying a first service agent contact center and a second service agent contact center of the one or more communications in the one or more positions in the wait queue;
  means for receiving a first offer from the first service agent contact center to service the at least one of the one or more communications based on a commodity of value;
  means for receiving a second offer from the second service agent contact center to service at least one of the one or more communications based on the commodity of value;
  means for accepting the first offer or part of the first offer from the first service agent contact center; and
  means for directing the at least one of the one or more communications to the first service agent contact center.

27. The system of claim 1, wherein the first offer is an offer to move the user backward in the wait queue.

28. The method of claim 13, wherein the first offer is an offer to move the user backward in the wait queue.

* * * * *